Aug. 27, 1940.  R. W. THOMAS  2,212,626
COMBINED REGULATOR AND RELIEF VALVE DEVICE
Filed March 28, 1938
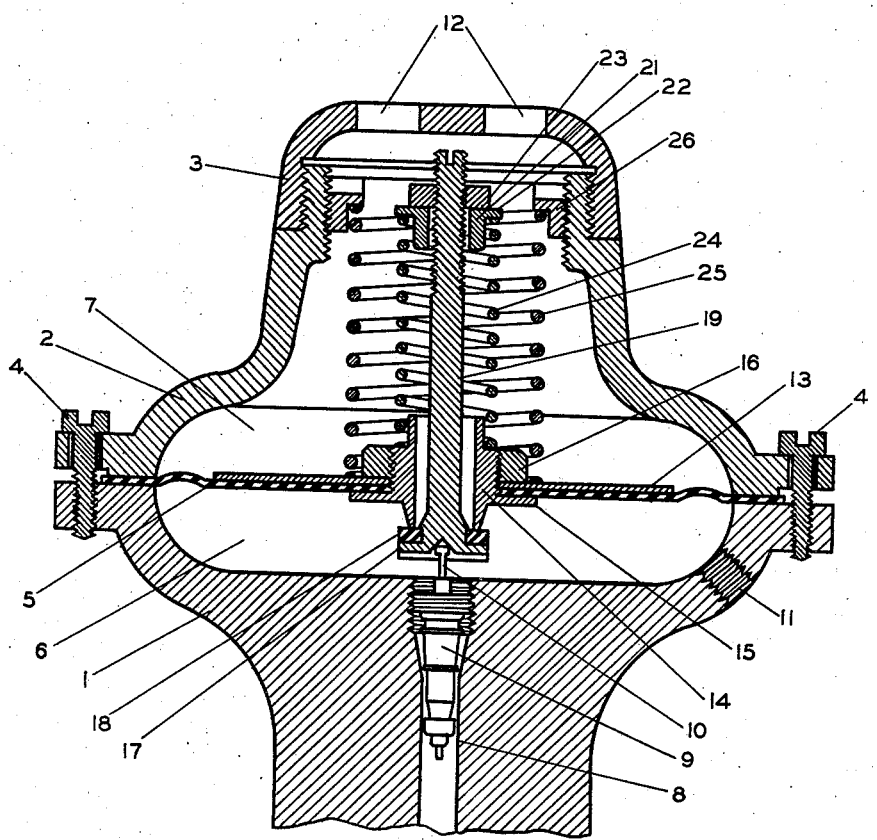
INVENTOR.
ROSSWELL W. THOMAS
BY
*Hudson Young Sharky & Yager*
ATTORNEYS.

Patented Aug. 27, 1940

2,212,626

UNITED STATES PATENT OFFICE 2,212,626

COMBINED REGULATOR AND RELIEF VALVE DEVICE

Rosswell W. Thomas, Birmingham, Mich., assignor to Phillips Petroleum Company, a corporation of Delaware Application March 28, 1938, Serial No. 198,519

1 Claim. (Cl. 50—23)

My invention relates to improvements in combined regulator and relief valve devices and more particularly to gas devices of this general character for use in reducing the pressure of gases from a high pressure source of supply to any desired pressure for consumption purposes.

In the past, various type of relief valves combined with pressure reducing means have been developed for the purpose of stepping down gas pressures and maintaining the lowered pressures uniform. Each type has proved unsatisfactory, however, due to inherent weaknesses in design, mechanical difficulties incurred during operation because of complicated mechanisms, and failure to operate properly for other reasons. This invention eliminates all the troubles experienced, heretofore, and performs the required functions in a highly successful manner.

One important object of this invention is to provide combined regulator and relief valve devices which operate readily and positively.

Another important object of this invention is to provide combined regulator and relief valve devices in which a relief valve will operate to prevent undesirable consumption pressure on failure of the regulator.

Another important object of this invention is to provide combined regulator and relief valve devices which are simple in construction, efficient in operation and adaptable to low-cost manufacture.

A further important object of this invention is to provide combined regulator and relief valve devices in which the number of moving parts is reduced to a minimum in order to insure against difficulties in adjusting or operating the same.

These and other objects and advantages will be apparent from the following description and annexed drawing which represents a vertical cross section view through a preferred embodiment of this invention.

Referring to the drawing, there is illustrated a housing which consists of a base 1, a top 2, and a cover 3, said base and top being fixedly connected by bolts 4. The interior of the housing constitutes a chamber which is divided by a flexible diaphragm 5 into two compartments, namely, a service compartment 6 and a relief compartment 7.

Service compartment 6 is provided with a gas inlet 8, embracing a regulator valve 9 with a valve stem 10, and has a service outlet 11. A preferred type of regulator valve is illustrated by the tire valve core type of valve. A relief outlet in relief compartment 7 is indicated by reference numeral 12.

Above diaphragm 5 is a back-up plate 13 and concentric with the diaphragm is an externally threaded valve sleeve 14 which has an annular shoulder 15. Through the cooperation of this shoulder 15 and a nut 16, sleeve 14 is rigidly mounted in the diaphragm.

A relief valve 17, having a resilient seating disc 18 attached thereto, forms one end of a valve stem 19. The opposite end of the relief valve stem is threaded so that a sleeve 21 with an annular shoulder 22 is adjustably located thereon by means of a nut 23. Intermediate shoulder 22 and sleeve 14 is a valve spring 24 which is concentric with valve stem 19. It is apparent that the compression on said spring 24 can be readily regulated and its normal effect is to maintain the seating disc 18 of valve 17 in contact with the lower end of sleeve 14.

A second or diaphragm spring 25, situated concentrically with respect to both the valve stem and the valve spring, is thrust at its lower end against back-up plate 13 through the action of an externally threaded nut 26. This nut 26 permits of proper adjustment of the pressure exerted by the diaphragm compression spring against the diaphragm. Access to the adjusting nuts 23 and 26 is rendered easy by simply removing cover 3.

In operation, the gas inlet 8 is connected to a source of fluid supply containing high pressure gas or liquefied gas. The admission of gas into service compartment 6 is controlled by regulator valve 9 embraced by the gas inlet.

The flexible diaphragm 5 is thrust downwardly as a consequence of the pressure exerted by diaphragm spring 25 on back-up plate 13. The pressure exerted by this spring may be adjusted to any predetermined amount by means of nut 26.

Referring to the relief valve arrangement, valve stem 19 is thrust upwardly with respect to the diaphragm and valve sleeve 14 by virtue of the pressure exerted by valve spring 24. The energy stored in this spring may be varied by loosening or tightening nut 23. The effect of the upward thrust on the valve stem is to raise valve 17 causing resilient seating disc 18 to rest on and close off the lower end of valve sleeve 14. It is to be noted that the relief valve parts, due to their interconnection with the diaphragm, move as a unit with the diaphragm, within limits later described.

Under normal operating conditions, the valve diaphragm together with its co-acting parts is forced downwardly by the diaphragm spring. This movement brings valve 17 against valve stem 10 and actuates regulator valve 9, thus permitting gas to enter the service chamber and leave the same by way of outlet 11. If the gas pressure in the service chamber becomes excessive, the diaphragm is moved upwardly against the action of the diaphragm spring and the regulator valve is gradually closed. Continued upward movement of the diaphragm past the point at which the regulator valve is closed, results in the top of valve stem 19 being forced against cover 3, and the unseating of valve 17. Part of the gas in the service chamber will then flow through valve sleeve 14, into relief compartment 7, and thence through relief outlet 12. As soon as the pressure of the gas in the service chamber falls below the pressure exerted by the diaphragm spring, then this spring moves the diaphragm downwardly again.

It is to be understood that the form of my invention, herewith shown and described is to be taken as a preferred example of the same and that various changes in shape, size and arrangement of parts may be resorted to without departing from the spirit of my invention as defined by the appended claim.

I claim:

A combined regulator and relief valve device comprising a housing, a diaphragm dividing the interior of the housing into a service compartment and a relief compartment, a cover in the relief compartment of the housing, means for actuating the diaphragm including a spring and means in threaded engagement with the inside wall of the relief compartment for adjustably controlling the pressure exerted by the spring on the diaphragm, a gas inlet in the service compartment, a gas outlet in the service compartment, a regulator valve associated with the gas inlet, a valve stem on the regulator valve, means associated with the diaphragm for coacting with the valve stem to operate the valve under normal movement of the diaphragm, a relief valve associated with the diaphragm, a valve stem associated with the relief valve and movable through the diaphragm, one end of said relief valve stem directly abutting the inside of the cover to open the relief valve upon abnormal movement of the diaphragm, means for maintaining the relief valve in closed position under normal movement of the diaphragm, and a gas outlet in the relief compartment.

ROSSWELL W. THOMAS.